United States Patent
Noyes

(10) Patent No.: US 11,342,831 B2
(45) Date of Patent: May 24, 2022

(54) HOMOPOLAR TURBINE

(71) Applicant: Lockheed Martin Corporation, Bethesda, MD (US)

(72) Inventor: Patrick Daniel Noyes, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 368 days.

(21) Appl. No.: 16/594,254

(22) Filed: Oct. 7, 2019

(65) Prior Publication Data
US 2021/0104945 A1  Apr. 8, 2021

(51) Int. Cl.
| | | |
|---|---|---|
| *H02K 55/06* | (2006.01) | |
| *F02C 6/14* | (2006.01) | |
| *F02C 6/00* | (2006.01) | |
| *H02K 7/18* | (2006.01) | |
| *F01D 5/18* | (2006.01) | |
| *H02K 44/08* | (2006.01) | |
| *F01D 15/10* | (2006.01) | |

(52) U.S. Cl.
CPC ............... *H02K 55/06* (2013.01); *F01D 5/18* (2013.01); *F01D 15/10* (2013.01); *F02C 6/00* (2013.01); *F02C 6/14* (2013.01); *H02K 7/1823* (2013.01); *H02K 44/08* (2013.01); *F05D 2220/32* (2013.01); *F05D 2220/76* (2013.01); *F05D 2260/20* (2013.01)

(58) Field of Classification Search
CPC ...... H02K 7/1823; H02K 44/08; H02K 55/06; F01D 5/18; F01D 15/10; F02C 6/00; F02C 6/14; F05D 2220/32; F05D 2220/76; F05D 2260/20
See application file for complete search history.

(56) References Cited

U.S. PATENT DOCUMENTS

| | | | |
|---|---|---|---|
| 3,678,306 | A | 7/1972 | Garnier et al. |
| 3,705,775 | A | 12/1972 | Rioux |
| 3,737,696 | A | 6/1973 | Richter et al. |
| 4,628,221 | A | 12/1986 | Young |
| 5,587,618 | A | 12/1996 | Hathaway |
| 7,732,966 | B2 | 6/2010 | Sivasubramaniam et al. |
| 7,819,626 | B2 | 10/2010 | Lee et al. |
| 8,365,510 | B2 | 2/2013 | Lugg |
| 8,585,356 | B2 | 11/2013 | Wiebe et al. |
| 9,180,770 | B1 | 11/2015 | Lugg |
| 9,181,900 | B1 | 11/2015 | Lugg |
| 9,525,214 | B2 | 12/2016 | Meinke et al. |

(Continued)

FOREIGN PATENT DOCUMENTS

EP  0642209 A1  3/1995

*Primary Examiner* — Pedro J Cuevas
(74) *Attorney, Agent, or Firm* — Baker Botts L.L.P.

(57) ABSTRACT

In one embodiment, a turbine includes a shaft and a turbine stage coupled to the shaft. The turbine stage includes a turbine blade. The turbine further includes a housing surrounding the turbine stage and a magnet located within the housing. The turbine is operable to receive an exhaust gas, generate a magnetic field using the magnet, and generate, by rotating the turbine blade, a current along the turbine blade in a radial direction toward the shaft. The turbine is further operable to ionize the exhaust gas between a tip of the turbine blade and the housing to form a plasma and electrically connect, using the plasma, the tip of the turbine blade to the housing.

20 Claims, 4 Drawing Sheets

(56) References Cited

U.S. PATENT DOCUMENTS

| | | |
|---|---|---|
| 9,627,780 B2 | 4/2017 | Meinke |
| 2009/0230690 A1 | 9/2009 | Bray et al. |
| 2010/0047055 A1 | 2/2010 | Wadia et al. |
| 2016/0177769 A1 | 6/2016 | Iwrey |
| 2016/0186570 A1 | 6/2016 | Lugg |
| 2016/0298538 A1 | 10/2016 | Lugg |
| 2020/0040846 A1* | 2/2020 | Lugg ................... F02K 3/072 |

\* cited by examiner

HOMOPOLAR TURBINE

TECHNICAL FIELD

This disclosure generally relates to turbines, and more specifically to homopolar turbines.

BACKGROUND

Aircraft components that are responsible for starting the engine and powering the aircraft utilize a shaft that is coupled to the main shaft of the engine. This shaft and the associated gears add complexity and weight to the engine, which may cause difficulties in generating the electrical power required for the aircraft. Also, for high peak power applications, additional batteries and/or capacitors may be required, which further increases the complexity and the weight of the system.

SUMMARY

In one embodiment, a turbine includes a shaft and a turbine stage coupled to the shaft. The turbine stage includes a turbine blade. The turbine further includes a housing surrounding the turbine stage and a magnet located within the housing. The turbine is operable to receive an exhaust gas, generate a magnetic field using the magnet, and generate, by rotating the turbine blade, a current along the turbine blade in a radial direction toward the shaft. The turbine is further operable to ionize the exhaust gas between a tip of the turbine blade and the housing to form a plasma and electrically connect, using the plasma, the tip of the turbine blade to the housing.

The magnet may be a superconducting, solenoid magnet and/or the magnetic field generated by the magnet may be an axial magnetic field. The plasma may have a higher viscosity than the exhaust gas surrounding the plasma. In certain embodiments, the turbine is further operable to cool a tip of the blade though electron evaporative cooling. The turbine may be part of an aircraft, the exhaust gas may be received from a combustor of the aircraft, and/or the turbine stage may be located closer to the combustor than other turbine stages of the turbine. The magnet may be operable to store energy for pulsed power applications. The shaft may include an electrical component that is operable to receive voltage from the current and distribute the voltage to one or more electrical devices.

According to another embodiment, a method includes receiving, by a turbine, an exhaust gas and generating, by a magnet located within a housing of a turbine, a magnetic field. The method also includes generating, by rotating the turbine blade, a current along a turbine blade of a turbine stage of the turbine in a radial direction toward a shaft of the turbine. The method further includes ionizing the exhaust gas between a tip of the turbine blade and the housing to form a plasma and electrically connecting, using the plasma, the tip of the turbine blade to the housing.

The magnet may be a superconducting, solenoid magnet and/or the magnetic field generated by the magnet may be an axial magnetic field. The plasma may have a higher viscosity than the exhaust gas surrounding the plasma. The method may further include cooling a tip of the blade though electron evaporative cooling. The turbine may be part of an aircraft, the exhaust gas may be received from a combustor of the aircraft, and the turbine stage may be located closer to the combustor than other turbine stages of the turbine. The method may further include storing, by the magnet, energy for pulsed power applications. The shaft may include an electrical component that receives voltage from the current and distributes the voltage to one or more electrical devices.

According to yet another embodiment, a system includes a combustor and a turbine. The turbine includes a shaft, a turbine stage coupled to the shaft, the turbine stage comprising a turbine blade, a housing surrounding the turbine stage, and a magnet located within the housing. The turbine is operable to receive an exhaust gas from the combustor and generate, using the magnet, a magnetic field. The turbine is also operable to generate, by rotating the turbine blade, a current along the turbine blade in a radial direction toward the shaft. The turbine is further operable to ionize the exhaust gas between a tip of the turbine blade and the housing to form a plasma and electrically connect, using the plasma, the tip of the turbine blade to the housing.

The magnet may be a superconducting, solenoid magnet and/or the magnetic field generated by the magnet may be an axial magnetic field. The plasma may have a higher viscosity than the exhaust gas surrounding the plasma. The turbine may be further operable to cool a tip of the blade though electron evaporative cooling. The magnet may be operable to store energy for pulsed power applications. The shaft may include an electrical component that is operable to receive voltage from the current and distribute the voltage to one or more electrical devices.

Technical advantages of this disclosure may include one or more of the following. The homopolar turbine described herein has a higher power to weight ratio and superior reliability than conventional power generation methods. The homopolar turbine supports both high electrical power loads and even higher peak power loads. By reducing the amount of gasses that leak past the turbine, the turbine is more efficient than current turbines and provides engine designers a tool for manipulating the combustion process. The generating system that includes the homopolar turbine may not have any moving parts other than the rotating turbine. The homopolar turbine may include a superconducting magnet that generates very high magnetic fields in packages that are lighter than traditional copper and iron systems, which reduces the weight of the system.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Certain embodiments of the homopolar turbine described herein include a high field superconducting magnet located around one or more turbine stages. The homopolar turbine can be used as a generator or an electric motor as needed. The movement of the turbine blades in the presence of an axial magnetic field generated by the magnet creates an electric field in a radial direction. If a current is passed through the turbine, an azimuthal force is generated. A plasma is lit at the tips of the turbine blades to complete the homopolar generator/motor circuit. During normal operation and while generating power, the high temperature exhaust is ionized with assistance from its internal energy and free radicals from the combustion. The current direction is in a direction toward the shaft from the outside housing so that electrons escaping from the turbine blades cool the blade tips through an effect known as electron evaporative cooling. During startup and in the motor mode, the gas near the turbine blade tips is excited to break down and pass a current. The plasma has a higher viscosity than the surrounding exhaust gasses, which reduces leakage past the turbine. As such, the homopolar turbine of this disclosure reduces complexity and weight, generates large amounts of power, has fewer moving parts, and increases reliability as compared to traditional turbines.

Figure 1:
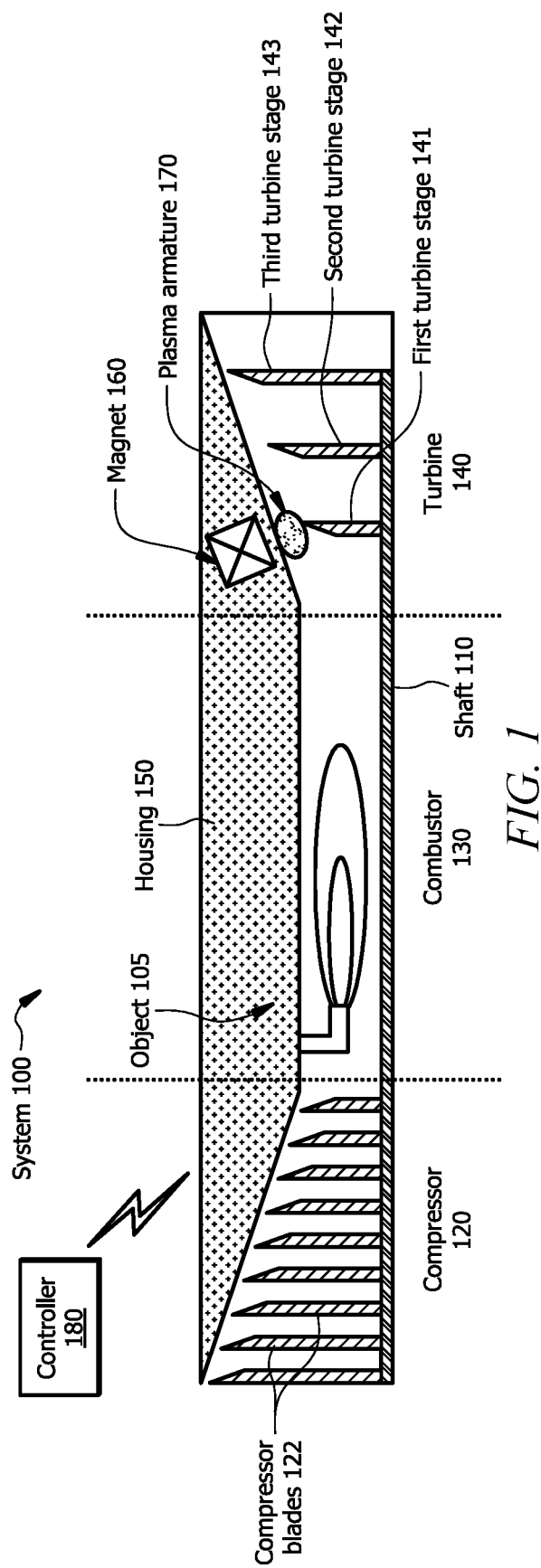
FIG. 1 illustrates an example system that uses a homopolar turbine.
Figure 2:
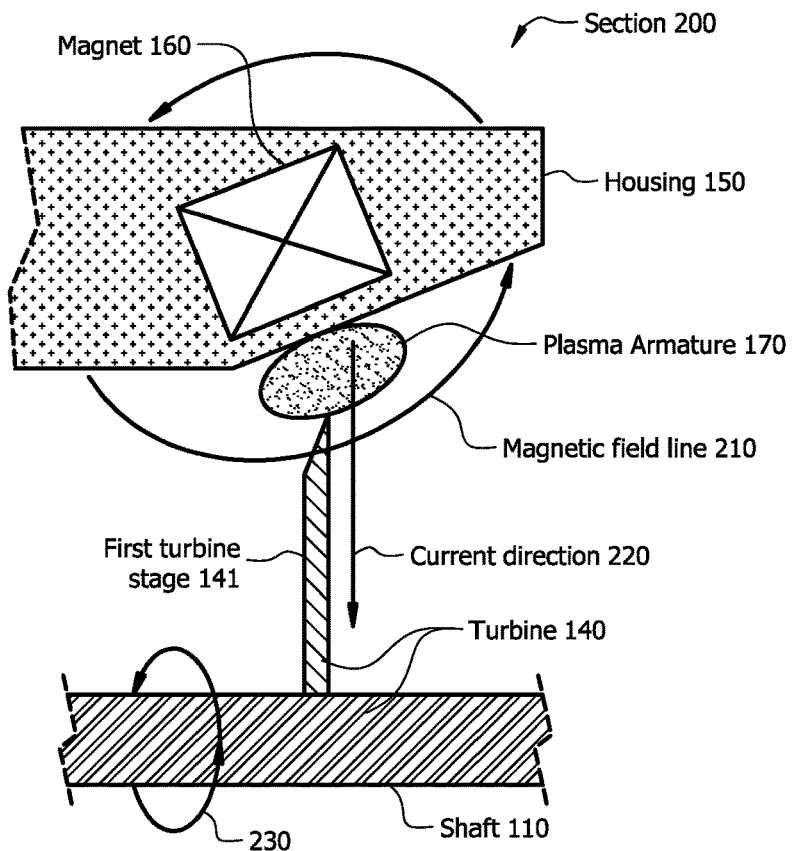
FIG. 2 illustrates an example section of the homopolar turbine of FIG. 1.
Figure 3:
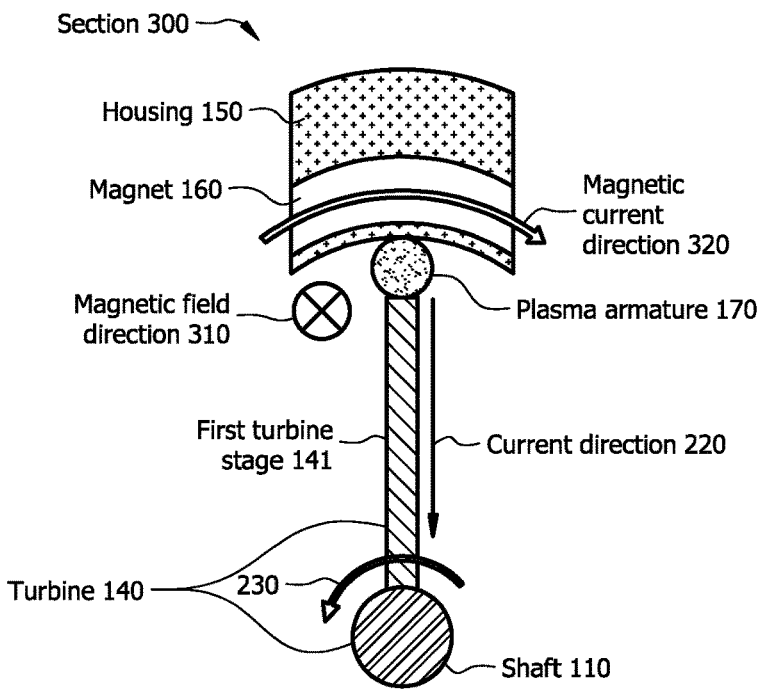
FIG. 3 illustrates another example section of the homopolar turbine of FIG. 1.
Figure 4:
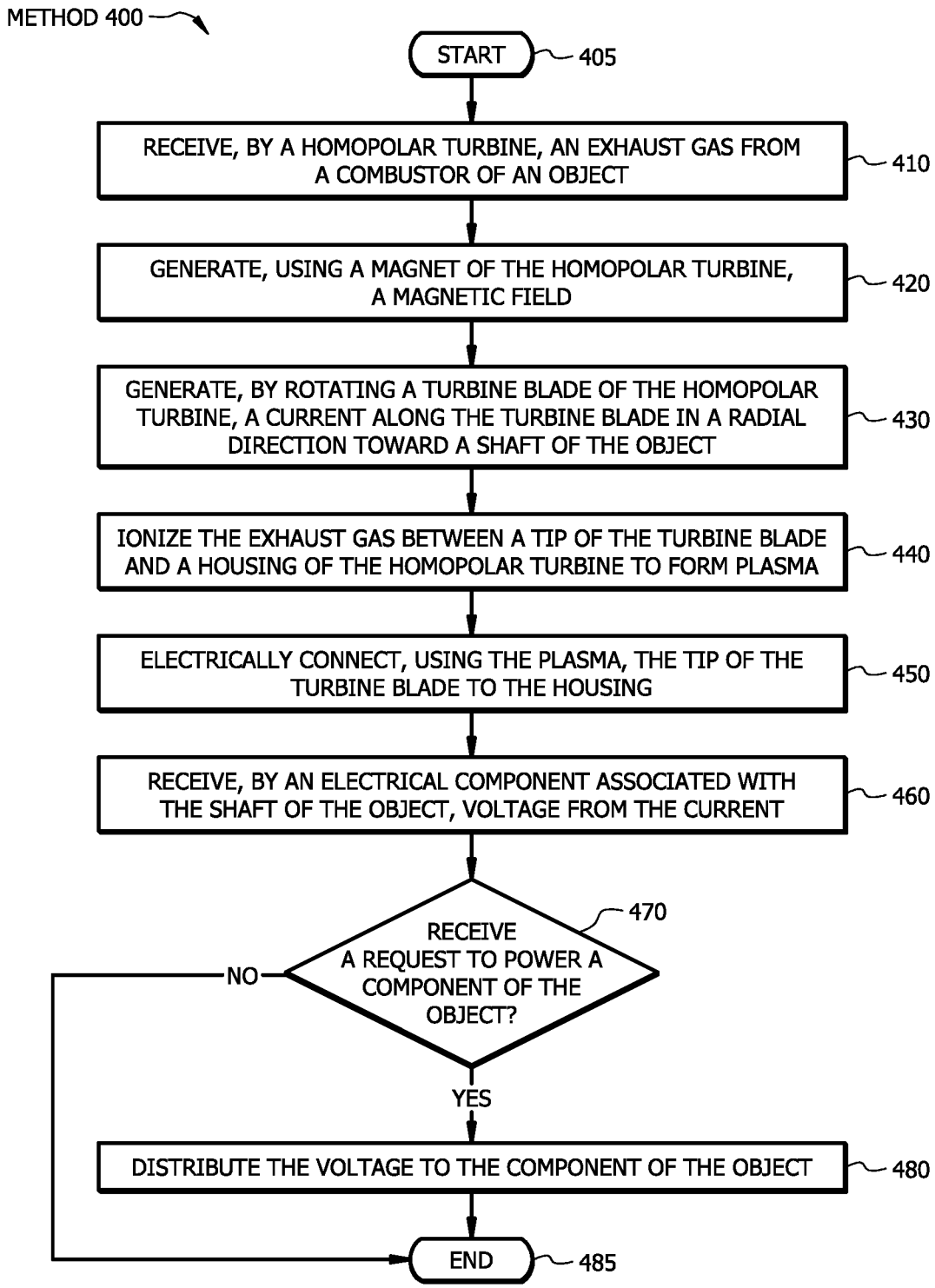
FIG. 4 illustrates an example method for generating power using a homopolar turbine.
Figure 5:
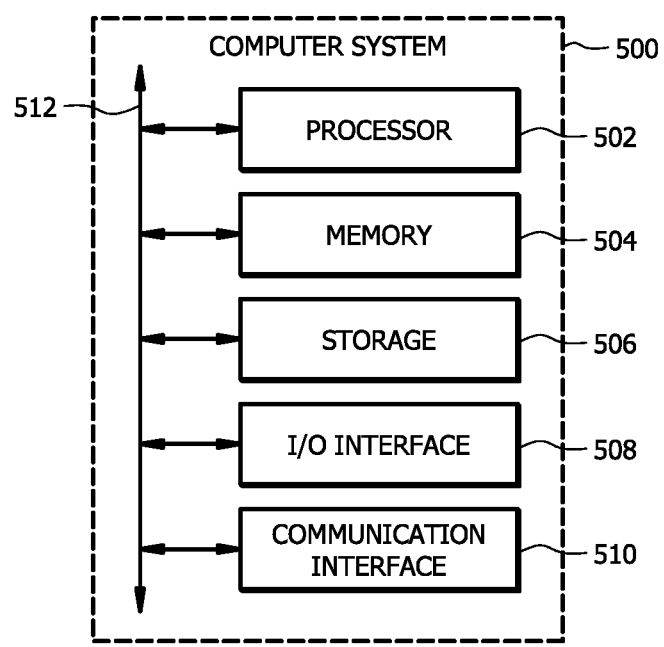
FIG. 5 illustrates an example computer system that may be used by the systems and methods described herein.

FIGS. 1 through 5 show example systems and methods associated with homopolar turbines. FIG. 1 shows an example system that uses a homopolar turbine, and FIGS. 2 and 3 show example sections of the homopolar turbine of FIG. 1. FIG. 4 shows an example method for generating power using a homopolar turbine. FIG. 5 shows an example computer system that may be used by the systems and methods described herein.

FIG. 1 illustrates an example system 100 associated with a homopolar turbine 140. System 100 of FIG. 1 incudes a shaft 110, a compressor 120, a combustor 130, turbine 140, a housing 150, a magnet 160, a plasma armature 170, and a controller 180. Shaft 110, compressor 120, combustor 130, turbine 140, housing 150, magnet 160, plasma armature 170, and controller 180 may be associated with any suitable object 105. Object 105 may be one or more portions (e.g., an engine) of an aircraft, a marine vessel, an automobile, and the like. System 100 may be used to generate power for object 105. Object 105 may be associated with industrial machinery, the aircraft industry, the automotive industry, the shipbuilding industry, and the like.

Shaft 110 of object 105 is any component that connects compressor 120 to turbine 140. Shaft 110 may be a cylindrical rod that rotates about an axis. In certain embodiments, shaft 110 may include an electrical component that receives voltage from a current generated by turbine 140. The electrical component may distribute the voltage to one or more electrical devices (e.g., instrumentation devices, radar systems, lasers, etc.) of object 105. Compressor 120 of object 105 is any component that receives air and compresses the air. In certain embodiments, compressor 120 receives air from one or more other components (e.g., a turbofan) of object 105. Compressor 120 includes compressor blades 122 that are coupled (e.g., directly attached) to shaft 110. As shaft 110 rotates about its axis, compressor blades 122 attached to shaft 110 rotate at a high speed to compress the received air into a smaller area, thereby increasing the air pressure.

Combustor 130 of object 105 is any component that mixes air with fuel to initiate a combustion process. Combustor 130 may receive high pressure air from compressor 120, mix the air with fuel, and ignite the air to generate a high temperature, high-energy airflow. Turbine 140 of object 105 is a component of object 105 that produces power for object 105. Turbine 140 includes one or more turbine stages. Each turbine stage includes a set of turbine blades. In the illustrated embodiment of FIG. 1, turbine 140 includes a first turbine stage 141, a second turbine stage 142, and a third turbine stage 143. Turbine 140 is coupled (e.g., physically attached) to shaft 110. The rotation of the turbine blades of first turbine stage 141, second turbine stage 142, and third turbine stage 143 cause shaft 110 to rotate. Turbine 140 receives the high temperature, high-energy airflow generated by combustor 130, which initiates the rotation of first turbine stage 141, second turbine stage 142, and third turbine stage 143.

Housing 150 of object 105 is any component that partially or fully surrounds one or more parts of object 105. For example, housing 150 may enclose compressor 120, combustor 130, and turbine 140. Housing 150 may protect compressor 120, combustor 130, and turbine 140 from debris, physical damage, and the like. In certain embodiments, housing 150 may include one or more cavities. The one or more cavities may include one or more components of object 105. For example, magnet 160 of object 105 may be located within housing 150 of object 105. In certain embodiments, the temperature of one or more portions of housing 150 may be regulated. For example, the cavity of housing 150 that contains magnet 160 may be temperature regulated to maintain a temperature between −452 degrees Fahrenheit and 315 degrees Fahrenheit. One or more portions of shaft 110, compressor 120, combustor 130, turbine 140, and housing 150 may be made of steel, aluminum, plastic, ceramics, fiberglass, any other suitable material, or a combination thereof.

Magnet 160 of object 105 is any component of object 105 that can produce a magnetic field. In the illustrated embodiment of FIG. 1, magnet 160 is a superconducting magnet. Magnet 160 may be a thin-wall superconducting solenoid. Magnet 160 may be any suitable size or shape. In the illustrated embodiment of FIG. 1, magnet 160 is a solenoid magnet. In certain embodiments, magnet 160 may be oval-shaped, rectangular-shaped, arc-shaped, rod-shaped, and the like. In certain embodiments, the width (e.g., diameter) of magnet 160 may range from two to eight feet (e.g., five feet.) Magnet 160 may be located within housing 150 to maintain a predetermined temperature. For example, magnet 160 may be located within a cavity of housing 150 that maintains a temperature between −452 degrees Fahrenheit and 315 degrees Fahrenheit. Magnet 160 may attach to housing using one or more of fiberglass brackets, metal wires, suspension, and the like. Magnet 160 may be located near a turbine stage closes to combustor 130. In the illustrated embodiment of FIG. 1, magnet 160 wraps around first turbine stage 141. Magnet 160 generates a magnetic field in a radial direction.

In certain embodiments, magnet 160 of object 105 may be coupled to a rotating assembly of object 105. For example, magnet 160 may be coupled (e.g., magnetically coupled) to one or more bearings, gears, shafts, and the like of a rotating assembly. By coupling magnet 160 to one or more components of the rotating assembly, magnet 160 may support mechanical loads and prolong the life of the one or more components (e.g., bearings).

In certain embodiments, magnet 160 stores energy for pulsed power applications. For example, magnet 160 may store several megajoules in its magnetic field. The energy stored by magnet 160 may be used to deliver power to one or more components (e.g., instrumentation, radar systems, lasers, railguns, etc.) external to object 105. For example, a large voltage (e.g., one or more megajoules) may be generated on one or more terminals of magnet 160, and a fraction of the inductively stored energy may be directed to one or more electrical devices external to object 105. The one or more terminals of magnet 160 may be connected to one or more switches to control the load distribution. For example, the one more switches may be used to turn the load on, turn the load off, reduce the load, increase the load, and the like. In certain embodiments, magnet 160 may serve as a superconducting magnetic energy storage (SMES) system.

Plasma armature 170 of object 105 is an area between the tip of the turbine blades of first turbine stage 141 and magnet 160 that includes plasma. The plasma is formed by ionizing exhaust gas received from combustor 130. Plasma armature 170 electrically connects the tip of the turbine blades of turbine stage 141 to housing 150 surrounding magnet 160. The plasma of plasma armature 170 has a higher viscosity than the exhaust gas surrounding the plasma outside of plasma armature 170.

Controller 180 of system 100 is any processing device that controls the operations of one or more components of system 100 and/or produces data. Controller 180 may control one or more operations of shaft 110, compressor 120, combustor 130, and/or turbine 140. An electrical component within shaft 110 of object 105 that receives voltage generated by turbine 110 may include controller 180. Controller 180 may determine whether one or more components outside of object 105 require power and/or initiate the distribution of power generated by turbine 140 to the one or more components. Controller 180 may be hard wired and/or wirelessly connected to object 105. Controller 180 may include a display. Controller 180 may use one or more elements of the computer system of FIG. 5.

In operation, turbine 140 of system 100 receives an exhaust gas from combustor 130. Magnet 160 is located within housing 150 of object 105 (e.g., an aircraft engine) and placed around first turbine stage 141 of turbine 140. Magnet 160 generates an axial magnetic field. First turbine stage 141 rotates about shaft 110. The turbine blades of first turbine stage 141 move at a high speed through the magnetic field, which generates a current along each turbine blade of first turbine stage 141 in a radial direction toward shaft 110 of object 105. An electrical component within shaft 110 receives voltage from the current and distributes the voltage to one or more electrical devices outside of object 105. As such, system 100 generates power while reducing weight and complexity as compared to existing power generating systems. One or more components of system 100 may replace numerous existing mechanical systems while providing a greater amount of electrical power, extending bearing life, and/or acting as a storage device for pulsed power applications. System 100 may reduce maintenance requirements while saving weight by eliminating the need for devices that contain volumes of copper and iron and which are connected through a set of gears.

Although system 100 of FIG. 1 illustrates a particular number of objects 105, shafts 110, compressors 120, compressor blades 122, combustors 130, turbines 140, first turbine stages 141, second turbine stages 142, third turbine stages 143, housings 150, magnets 160, and plasma armatures 170, this disclosure contemplates any suitable number of objects 105, shafts 110, compressors 120, compressor blades 122, combustors 130, turbines 140, first turbine stages 141, second turbine stages 142, third turbine stages 143, housings 150, magnets 160, and plasma armatures 170. For example, system 100 of FIG. 1 may include more or less than three turbine stages.

Although system 100 of FIG. 1 illustrates a particular arrangement of object 105, shaft 110, compressor 120, compressor blade 122, combustor 130, turbine 140, first turbine stage 141, second turbine stage 142, third turbine stage 143, housing 150, magnet 160, and plasma armature 170, this disclosure contemplates any suitable arrangement of object 105, shaft 110, compressor 120, compressor blade 122, combustor 130, turbine 140, first turbine stage 141, second turbine stage 142, third turbine stage 143, housing 150, magnet 160, and plasma armature 170. For example, plasma armature 170 may be located between the tip of the turbine blades of first turbine stage 141 and magnet 160, between the tip of the turbine blades of second turbine stage 142 and magnet 160, and/or between the tip of the turbine blades of third turbine stage 143 and magnet 160.

FIG. 2 illustrates an example section 200 of turbine 140 of FIG. 1. Section 200 includes shaft 110, first turbine stage 141, housing 150, magnet 160, and plasma armature 170 of FIG. 1. Section 200 is cut along a length of shaft 110. The turbine blades of first turbine stage 141 are physically attached to shaft 110. The rotation of turbine blades of first turbine stage 141 cause the rotation of shaft 110. In the illustrated embodiment of FIG. 2, shaft 110 rotates in a counterclockwise direction as indicated by notation 230. Magnet 160 generates an axial magnetic field as indicated by magnetic field line 210. Magnetic field line 210 is perpendicular to both the rotation of turbine 140 and the current path.

Rotation of the turbine blades of first turbine stage 141 generates a current along each turbine blade in a radial direction toward shaft 110 of turbine 140, as indicated in FIG. 2 by current direction 220. The current flowing from housing 150 to shaft 110 has a cooling effect on first turbine stage 141. Electrons escaping from the turbine blades of first turbine stage 141 cool the blade tips through an effect known as electron evaporative cooling. During startup and in motor mode, the exhaust gas surrounding the turbine blade tips is excited to break down and pass the current. The high-speed rotation of the turbine blades of first turbine stage 141 through the magnetic field generated by magnet 160 ionizes the exhaust gas between the tips of the turbine blades and housing 150 to form plasma armature 170. The internal energy of the high temperature exhaust gas and the presence of free radicals from the combustion process may assist in the ionization of the exhaust gas. Plasma armature 170 electrically connects the tips of the turbine blades to housing 150. The plasma of plasma armature 170 has a higher viscosity than the surrounding exhaust gases such that leakage past turbine 140 is reduced.

FIG. 3 illustrates an example section 300 of turbine 140 of FIG. 1. Section 300 includes shaft 110, first turbine stage 141, housing 150, magnet 160, and plasma armature 170 of FIG. 1. Section 300 is cut through shaft 110 of turbine 140. As shown, magnet 160 is enclosed within housing 150. Magnet 160 generates an axial magnetic field having magnetic field direction 310 and magnetic current direction 320. Magnetic current direction 320 is the current direction in magnet 160. Magnetic field direction 310 is the field generated by the current indicated by current direction 320. Rotation of the turbine blades of first turbine stage 141 generates a voltage along each turbine blade in a radial direction toward shaft 110 of turbine 140, as indicated in FIG. 3 by current direction 220. During startup and in motor mode, the exhaust gas surrounding the turbine blade tips is excited to break down and pass the current. The high-speed rotation of the turbine blades of first turbine stage 141 through the magnetic field generated by magnet 160 generates a voltage that ionizes the exhaust gas between the tips of the turbine blades and housing 150 to form plasma armature 170.

Although sections 200 and 300 of FIGS. 2 and 3, respectively, illustrate a particular number of shafts 110, turbines 140, first turbine stages 141, housings 150, magnets 160, and plasma armatures 170, this disclosure contemplates any suitable number of shafts 110, turbines 140, first turbine stages 141, housings 150, magnets 160, and plasma armatures 170. For example, section 200 may include a second turbine stage, a third turbine stage, and so forth. Although sections 200 and 300 of FIGS. 2 and 3, respectively, illustrate a particular arrangement of shaft 110, turbine 140, first turbine stage 141, housing 150, magnet 160, and plasma armature 170, this disclosure contemplates any suitable arrangement of shaft 110, turbine 140, first turbine stage 141, housing 150, magnet 160, and plasma armature 170.

FIG. 4 illustrates an example method for generating power using a homopolar turbine. Method 400 begins at step 405. At step 410, an exhaust gas is received by a homopolar turbine (e.g., turbine 140 of FIG. 1) from a combustor (e.g., combustor 130 of FIG. 1) of an object (e.g., object 105 of FIG. 1). The object may be one or more portions (e.g., an engine) of an aircraft, a marine vessel, an automobile, and the like. Method 400 then moves from step 410 to step 420, where a magnetic field is generated using a magnet (e.g., magnet 160 of FIG. 1) located within a housing (e.g., housing 150 of FIG. 1) of an object (e.g., object 105 of FIG. 1). In certain embodiments, the magnet is a superconducting, solenoid magnet located around a turbine stage of the turbine. Method 400 then moves from step 420 to step 430.

At step 430, the turbine blades of the homopolar turbine are rotated to generate a current along the turbine blades in a radial direction toward the shaft of the object. For example, during startup and in motor mode, exhaust gas surrounding the tips of the turbine blades may be excited to break down and pass a current. Method then moves from step 430 to step 440, where the exhaust gas between the tips of the turbine blades and the housing of the homopolar turbine is ionized to form a plasma. For example, the high-speed rotation of the turbine blades of one or more turbine stages through the magnetic field generated by the magnet may ionize the exhaust gas between the tips of the turbine blades and housing 150 to form a plasma armature. The internal energy of the high temperature exhaust gas and the presence of free radicals from the combustion process may assist in the ionization of the exhaust gas. Method 400 then moves from step 440 to step 450.

At step 450, the tips of the turbine blades are electrically connected to the housing by the plasma. The plasma of plasma armature has a higher viscosity than the surrounding exhaust gases such that leakage past turbine is reduced. Method 400 then moves from step 450 to step 460, where an electrical component associated with the shaft of the object receives voltage from the current. In certain embodiments, the electrical component is located within the shaft. Method 400 then moves from step 460 to step 470.

At step 470, the electrical component determines whether a request has been received to power a component of the aircraft. For example, an instrument of the aircraft may send a signal to a controller of the electrical component requesting power or indicating that its power level is low, and the controller of the electrical component may receive the signal. If the electrical component receives a request to power a component of the aircraft, method 400 moves from step 470 to step 480, where the electrical component distributes voltage to the component of the aircraft. Method 400 then moves to step 485, where method 400 ends. If the electrical component does not receive a request to power a component of the aircraft, method 400 advances from step 470 to step 485, where method 400 ends.

Modifications, additions, or omissions may be made to method 400 depicted in FIG. 4. Method 400 may include more, fewer, or other steps. For example, method 400 may include coupling the magnet to a rotating assembly. As another example, method 400 may include storing, using the magnet, energy for pulsed power applications. Steps of method 400 depicted in FIG. 4 may be performed in parallel or in any suitable order. For example, one or more steps depicted in FIG. 4 may occur simultaneously. As another example, step 460 directed to receiving a request to power a component o the object may occur prior to step 430 directed to generating a current along the turbine blade of the object. While discussed as specific components completing the steps of method 400, any suitable component may perform any step of method 400.

FIG. 5 illustrates an example of elements 500 that may be included in system 100 of FIG. 1, according to certain embodiments. For example, controller 180 of FIG. 1 may include one or more interface(s) 510, processing circuitry 520, memory(ies) 530, and/or other suitable element(s). Interface 510 receives input, sends output, processes the input and/or output, and/or performs other suitable operation. Interface 510 may comprise hardware and/or software.

Processing circuitry 520 performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A turbine, comprising:
   a shaft;
   a turbine stage coupled to the shaft, the turbine stage comprising a turbine blade;
   a housing surrounding the turbine stage; and
   a magnet located within the housing;
   wherein the turbine is operable to:
      receive an exhaust gas;
      generate, using the magnet, a magnetic field;
      generate, by rotating the turbine blade, a current along the turbine blade in a radial direction toward the shaft;
      ionize the exhaust gas between a tip of the turbine blade and the housing to form a plasma; and
      electrically connect, using the plasma, the tip of the turbine blade to the housing.

2. The turbine of claim 1, wherein:
   the magnet is a superconducting, solenoid magnet; and
   the magnetic field generated by the magnet is an axial magnetic field.

3. The turbine of claim 1, wherein the plasma has a higher viscosity than the exhaust gas surrounding the plasma.

4. The turbine of claim 1, wherein the turbine is further operable to cool a tip of the blade though electron evaporative cooling.

5. The turbine of claim 1, wherein:
   the turbine is part of an aircraft;
   the exhaust gas is received from a combustor of the aircraft; and
   the turbine stage is located closer to the combustor than other turbine stages of the turbine.

6. The turbine of claim 1, wherein the magnet is operable to store energy for pulsed power applications.

7. The turbine of claim 1, wherein the shaft comprises an electrical component that is operable to receive voltage from the current and distribute the voltage to one or more electrical devices.

8. A method, comprising:
   receiving, by a turbine, an exhaust gas;
   generating, by a magnet located within a housing of the turbine, a magnetic field;
   generating, by rotating a turbine blade, a current along the turbine blade of a turbine stage of the turbine in a radial direction toward a shaft of the turbine;
   ionizing the exhaust gas between a tip of the turbine blade and the housing to form a plasma; and
   electrically connecting, using the plasma, the tip of the turbine blade to the housing.

9. The method of claim 8, wherein:
   the magnet is a superconducting, solenoid magnet; and
   the magnetic field generated by the magnet is an axial magnetic field.

10. The method of claim 8, wherein the plasma has a higher viscosity than the exhaust gas surrounding the plasma.

11. The method of claim 8, further comprising cooling a tip of the blade though electron evaporative cooling.

12. The method of claim 8, wherein:
    the turbine is part of an aircraft;
    the exhaust gas is received from a combustor of the aircraft; and
    the turbine stage is located closer to the combustor than other turbine stages of the turbine.

13. The method of claim 8, further comprising storing, by the magnet, energy for pulsed power applications.

14. The method of claim 8, wherein the shaft comprises an electrical component that receives voltage from the current and distributes the voltage to one or more electrical devices.

15. A system, comprising:
    a combustor; and
    a turbine, wherein the turbine comprises:
       a shaft;
       a turbine stage coupled to the shaft, the turbine stage comprising a turbine blade;
       a housing surrounding the turbine stage; and
       a magnet located within the housing;
    wherein the turbine is operable to:
       receive an exhaust gas from the combustor;
       generate, using the magnet, a magnetic field;
       generate, by rotating the turbine blade, a current along the turbine blade in a radial direction toward the shaft;
       ionize the exhaust gas between a tip of the turbine blade and the housing to form a plasma; and
       electrically connect, using the plasma, the tip of the turbine blade to the housing.

16. The system of claim 15, wherein:
    the magnet is a superconducting, solenoid magnet; and
    the magnetic field generated by the magnet is an axial magnetic field.

17. The system of claim 15, wherein the plasma has a higher viscosity than the exhaust gas surrounding the plasma.

18. The system of claim 15, wherein the turbine is further operable to cool a tip of the blade though electron evaporative cooling.

19. The system of claim 15, wherein the magnet is operable to store energy for pulsed power applications.

20. The system of claim 15, wherein the shaft comprises an electrical component that is operable to receive voltage from the current and distribute the voltage to one or more electrical devices.

\* \* \* \* \*